Dec. 21, 1965    R. W. McCLUNG ET AL    3,225,294
METHOD AND APPARATUS FOR MEASURING THE
SPACE BETWEEN SURFACES OR OBJECTS
Filed Sept. 29, 1961

INVENTORS.
Robert W. McClung
Caius V. Dodd
BY John W. Allen, Jr.
Roy A. Nance

ATTORNEY.

United States Patent Office 3,225,294
Patented Dec. 21, 1965

3,225,294
METHOD AND APPARATUS FOR MEASURING THE SPACE BETWEEN SURFACES OR OBJECTS
Robert W. McClung and Caius V. Dodd, Knoxville, Tenn., and John W. Allen, Jr., and Roy A. Nance, Malvern, Pa., assignors to the United States of America as represented by the United States Atomic Energy Commission
Filed Sept. 29, 1961, Ser. No. 141,921
3 Claims. (Cl. 324—40)

This invention relates to spacing gauges and more particularly to a gauge for accurately determining the distance between adjacent surfaces, and has special application in measuring the spacing of fuel plates and other objects in nuclear reactors.

The tolerances required in nuclear reactor technology have created a demand for accurate measuring techniques to assure conformance with these tolerances. An example of these tolerances is the spacing in coolant channels associated with reactor fuel elements. These spacings must be held within some given narrow range for a specific reactor in order to maintain the desired temperature distribution and fuel element life. Because of the various configurations used in present and prospective fuel elements of reactors, the method of determining the spacing thereof must be amenable to the different configurations of coolant flow channels, e.g., between flat parallel plates, curved parallel plates, cylindrical rods and through cylindrical passages.

In recent years, the technique of eddy-current non-destructive testing has been applied to many measuring applications. The prior art has also given recognition to the fact that varying the spacing between the probe and the specimen effects the induced eddy-currents. See Eul, 2,939,073, column 3, lines 22–35; Renken, 2,985,824, column 1, lines 34–35; Renken, 2,965,840, column 1, lines 37–45. However, this characteristic has been considered to have an adverse effect upon the operation of these prior art systems, and to serve no useful purpose.

Applicants, with a knowledge of these principles and the problems involved, have for an object of their invention the provision of an apparatus and method of measuring the spacing between surfaces by the application of eddy-currents and the measurement of the reaction therefrom.

Applicants have as another object of their invention the provision of an eddy-current operated measuring gauge for application to plane surfaces.

Applicants have as a further object of their invention the provision of an eddy-current operated measuring gauge for measuring the spacing between objects of irregular cross section.

Applicants have as a still further object of their invention the provision of an eddy-current operated measuring gauge for measuring the internal diameter of tubular elements.

Other objects and advantages of our invention will appear from the following specification and accompanying drawings, and the novel features thereof will be particularly pointed out in the annexed claims.

Basically, the eddy-current principle involves propagating electromagnetic waves from a coil into a conducting material so as to produce eddy-currents therein. These currents, in turn, influence the electrical impedance of the generating coil. This change in impedance is a function of the geometry of the coil, the frequency of the energizing signal to the coil, the conductivity and magnetic permeability of the conducting material, and the distance between the coil and the conducting material. With any three of these factors held constant, any change in the fourth factor may be detected by a change in impedance. The impedance of the coil is normally measured using a bridge circuit, which is commercially available from a number of sources including Unit Processing Assemblies, Inc., New York, N.Y. A suitable bridge circuit is also described in "Nondestructive Testing Handbook," vol. 2, page 40.6 (1959), edited by Robert C. McMaster, and published by Ronald Press Company, New York, N.Y. For the specific measuring application, the spacing was made the variable factor and all other factors held nearly constant.

In nuclear reactors the major problem involved in the measurement of coolant-channel spacing is that of positioning the energizing coil in the coolant channel. Means for accomplishing this for the different configurations are shown in the various figures of the drawings.

Figure 1:
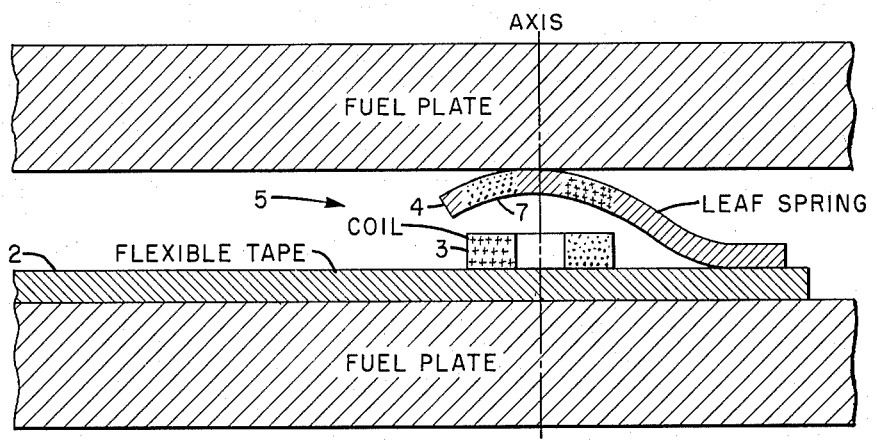
FIG. 1 is a sectional elevation showing our improved probe used in the measurement of spacing between generally parallel plane surfaces.

Referring now to FIG. 1, a measuring probe is shown that is useful for determining the spacing between plates, either curved or flat. It is used for measuring the spacing between adjacent fuel plates in fuel elements such as used in the Materials Testing Reactor (MTR), Bulk Shielding Reactor (BSR), Tower Shielding Reactor (TSR), Fermi Reactor and High Flux Isotope Reactor (HFIR). The gauge or probe generally designated 5, may be used to measure spacing between plates 1, 1 that are made of any suitable material. In the arrangement shown, a length of flexible metal tape 2, similar to a steel measuring tape, engages one surface of the fuel plate and mounts the electromagnetic coil 3 on an intermediate portion. This coil when energized with A.C. will generate the eddy-currents. Bonded or otherwise secured integrally to one surface of the tape 2 near a free end thereof is an arched steel leaf spring 4 having a curved portion 7 of spring steel or other suitable material that is adapted to overlie coil 3, and which is designed to contact the surface of a fuel plate 1 through its outer convex face. The tape and leaf spring are fabricated from a ferromagnetic or high conductivity material, and the arch of the leaf spring is such that with the tape in contact with one fuel plate, the spring is in contact with the fuel plate on the opposite side of the coolant channel. The eddy-currents are set up in leaf spring 4 by coil 3 and in turn react on the coil to change its impedance. The magnetic properties of the probe have negligible effect on the impedance since the frequencies employed are above 100 kc. The circuit (not shown) coupled to coil 3 measures the spacing between plates 1, 1 taking into account the thickness of tape 2 and leaf spring 4. This modifiction is best suited for flat plates or parallel objects of other configurations.

This type of probe has been used for measuring fuel-plate spacings in several ranges: 0.030 to 0.070 inch; 0.050 to 0.060 inch; and 0.110 to 0.160 inch. The accuracy achieved in the most inaccurate portion of the nonlinear calibration has been 5 to 10 percent of the measured span. Greater accuracy can be achieved if desired by, for example, providing a larger signal variation for a given dimensional variation. Other important modifications to increase accuracy include providing better mechanical standards and improved manual operation. Measurements of the spacing are detected using a calibrated meter or chart recorder.

Figure 2:
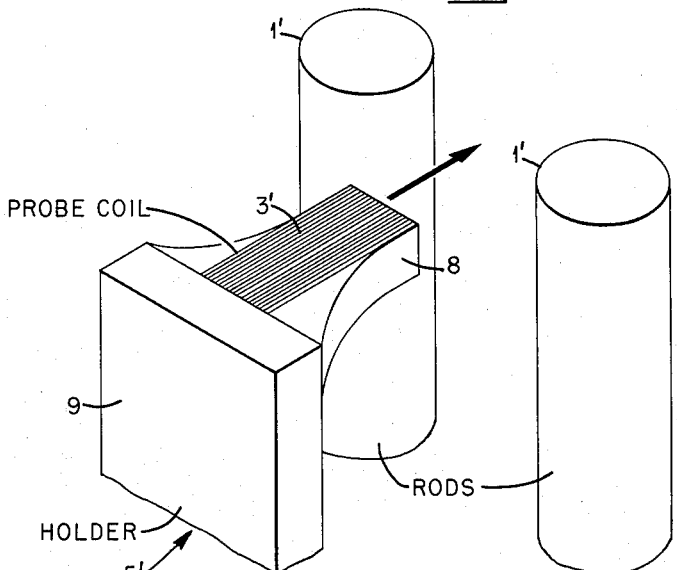
FIG. 2 is a perspective showing another form of our improved gauge used for measurement of spacing between generally parallel tubes.

Referring now to FIG. 2, a gauge or probe 5' is shown that is preferably used for determining the spacing between parallel cylindrical fuel elements. This probe has a generally wedge-shaped body 8 of plastic or other suitable nonconducting material, with the opposite faces which contact the tubes contoured to give optimum signal response. The energizing coil 3' is wound on the body or bobbin 8 so that the plane of the coil is parallel to the axes of the tubes 1', 1' which are of some conducting material such as stainless steel. Any variation in the spacing of the tubes, as the probe is moved axially, causes the probe to move inward or outward between tubes (because of the shape of the wedge), and thus the impedance of the coil is changed to give rise to a signal indicating the change in spacing. For the purpose of moving the probe a suitable handle 9 of plastic or other material may be used.

Although the accuracy and linearity of this probe are less than the probe of FIG. 1, a satisfactory gaging of the space between cylinders is achievable. The optimum contour of the body 8 of the probe may be varied, as required, for different sizes of tubes in order to achieve optimum accuracy and linearity.

In its operation, eddy-currents set up in the rods 1', 1' react upon the winding of the coil 3' changing its impedance. This is reflected in the measuring circuit. By setting up tolerance limits on the scale of the measuring instrument, readings that fall within the tolerance limits, upon insertion of the probe between the surfaces of the tubes 1', 1' indicate that the spacing is acceptable. The arrangement of FIG. 2 is useful primarily for measuring spacings between parallel rods or tubes of a variety of configurations including cylindrical, triangular, octangular, etc. However, their major axes should preferably be parallel.

Figure 3:
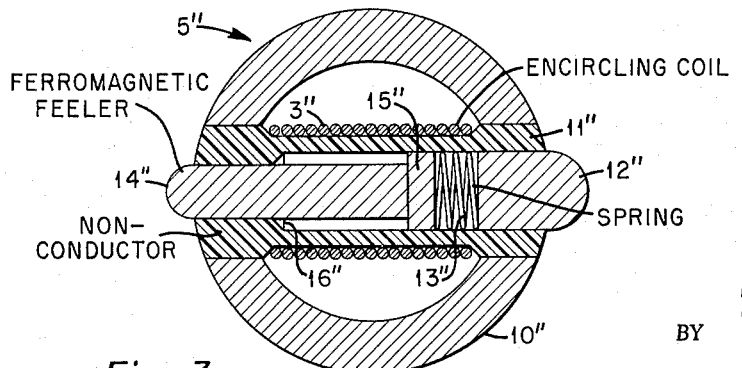
FIG. 3 is a cross sectional view of another form of probe used for the measurement of the inside diameter of tubing.

Referring now to FIG. 3 of the drawings, the probe 5'' is useful for the measurement or gaging of the inside diameter of a tube, e.g., a coolant channel. In this embodiment, one fixed hemispherically shaped leg or projection 12'' contacts the inner wall of the tube and a yieldable projection or "feeler" 14'' also contacts the inner wall of the tube bridging the inner diameter thereof. In this arrangement, a sleeve 11'', of plastic or other non-conducting material, is mounted on an elongated handle 10'', preferably of tubular configuration. Plug or lug 12'' is fixedly secured in one end of sleeve 11'', and plunger or feeler 14'' is freely slidable within limits in sleeve 11'' under the influence of compression spring 13''. Of course, enlarged end 15'' serves as a stop against excessive outward movement of plunger 14'' when it engages shoulder 16'' of sleeve 11''. An energizing coil 3'' encircles the cavity in which the feeler 14'' reciprocates, and sets up eddy currents in feeler 14'' that are concentric with the turns of coil 3'', but flow in paths that are in opposite direction to the current flow in coil 3''. Reciprocation of feeler 14'' changes the resultant eddy-currents and thus the coil impedance varies as a function of the amount of feeler that is within the field of the coil. As in the other embodiments, the measurement of the impedance, i.e., the variation of impedance, is a function of spacing—in this case the inside diameter of the cylinder. This embodiment, in addition to being suitable for the measurement of cooling passages, is useful for measuring the inside of tubes, e.g., fuel tubes before they are filled. While it is best suited for measuring internal tolerances in tubing, this embodiment may also be applied for measuring spacings to such structures as shown in FIGS. 1 and 2.

In operation, and by using a long handle 10'', the probe 5'' may be inserted into and moved along the axis of a length of tubing. Using a plunger or feeler 14'' of magnetic material, movement in and out of sleeve 11'', depending upon the irregularities of the inner surfaces of the specimen of tubing under examination, changes the impedance of coil 3'', and in turn the balance of the bridge in the measuring circuit (not shown), to indicate whether the internal channel of the tubing is within the desired tolerances.

The above-described probes provide means for determining the spacing between almost all types of surfaces. Furthermore, the eddy-current method is rapid, accurate and inexpensive while at the same time provides for automatic measurement and permanent records of the gaging.

Having thus described our invention, we claim:

1. An eddy-current probe for insertion between two opposed surfaces for determining spacing comprising an expandable body for engagement with spaced surfaces, a coil mounted on the body and having a series of turns of conducting material for the passage of electric current to set up a magnetic field to induce eddy current in the body for altering the impedance of the coil, and means for positioning the probe between the surfaces whose spacing is to be measured.

2. An eddy-current probe for insertion between two opposed surfaces for determining spacing comprising an elongated strip of electrically conductive material for engagement with a surface, a leaf spring of electrically conductive material extending along and converging toward the strip and joined thereto adjacent one end for engagement with another surface, and an electrical element for setting up a magnetic field interposed between the leaf spring and strip and mounted on the strip and electromagnetically coupled to said spring and said strip and responsive to changes in their positions for measuring the spacing between opposed surfaces.

3. An eddy-current probe for insertion into a tubular element for determining the wall spacing comprising a pair of feelers for movement with respect to each other to engage a pair of opposed surfaces, means for yieldingly urging said feelers away from each other, an electromagnetic element for producing a magnetic field disposed about the feelers whereby relative movement of the feelers changes the impedance of the electromagnetic element and produces a signal, and an elongated handle portion for mounting the electrical element to insert it into and move it along a length of tubing.

References Cited by the Examiner

UNITED STATES PATENTS 2,235,533   3/1941   Roberts _____ 33—178

FOREIGN PATENTS 884,111   7/1953   Germany.

RICHARD B. WILKINSON, *Primary Examiner.*

WALTER L. CARLSON, *Examiner.*

RICHARD E. KLEIN, *Assistant Examiner.*